(12) United States Patent
Ueda et al.

(10) Patent No.: US 8,914,904 B2
(45) Date of Patent: Dec. 16, 2014

(54) INFORMATION PROCESSING APPARATUS, DATA PROCESSING METHOD AND PROGRAM

(75) Inventors: Kenjiro Ueda, Kanagawa (JP); Jun Yonemitsu, Kanagawa (JP); Masanobu Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 13/056,937

(22) PCT Filed: Aug. 12, 2009

(86) PCT No.: PCT/JP2009/064239
§ 371 (c)(1),
(2), (4) Date: Jan. 31, 2011

(87) PCT Pub. No.: WO2010/021281
PCT Pub. Date: Feb. 25, 2010

(65) Prior Publication Data
US 2011/0131665 A1 Jun. 2, 2011

(30) Foreign Application Priority Data

Aug. 21, 2008 (JP) ................................. 2008-212485

(51) Int. Cl.
*G06F 7/04* (2006.01)
(Continued)

(52) U.S. Cl.
CPC ........... *H04N 5/913* (2013.01); *H04N 21/8355* (2013.01); *H04N 21/4431* (2013.01);
(Continued)

(58) Field of Classification Search
CPC .......................... G06F 21/33; G06F 2221/0711

USPC ...................................... 726/29; 380/201, 202
See application file for complete search history.

(56) References Cited

U.S. PATENT DOCUMENTS 5,960,151 A * 9/1999 Takahashi ..................... 386/253
7,076,668 B1 * 7/2006 Ono et al. ...................... 713/193
(Continued)

FOREIGN PATENT DOCUMENTS

| EP | 0809244 | 11/1997 |
| EP | 1655668 | 5/2006 |

(Continued)

OTHER PUBLICATIONS

Intel Corporation et al, Advanced Access Content System: Pre-Recorded Video Book. AACS LA LLC, Feb. 17, 2006; 1-61. Retrieved from the Internet: http://web.archive.org/web/200603181711/www.aacsla.com/specifications/specs091/AACS_Spec_Prerecorded_0.91.pdf. Retrieved on Jun. 15, 2007.

*Primary Examiner* — Dant Shaifer Harriman
(74) *Attorney, Agent, or Firm* — Wolf, Greenfield & Sacks, P.C.

(57) ABSTRACT

A configuration is achieved in which content copying between media and content downloading are performed effectively and under strict management. In content copying between media, the identification information (medium ID) of a copying destination medium is obtained using an API for providing a predefined processing, then the obtained medium ID is transmitted to a server to obtain copying permission information from the server, and then content copying is performed under the management of the server. This configuration allows a copying destination medium to be managed, which can eliminate the unauthorized use of the content. Also, the configuration in which content downloading from the server is performed according to, for example, a Java® program allows a ROM disc on which the content is recorded to store the program and to be provided to a user.

12 Claims, 11 Drawing Sheets

(51) Int. Cl.

| | | |
|---|---|---|
| *G06F 17/30* | (2006.01) | |
| *H04N 7/16* | (2011.01) | |
| *H04N 5/913* | (2006.01) | |
| *H04N 21/8355* | (2011.01) | |
| *H04N 21/443* | (2011.01) | |
| *H04N 7/173* | (2011.01) | |
| *G11B 20/00* | (2006.01) | |
| *H04N 21/4627* | (2011.01) | |
| *H04N 21/835* | (2011.01) | |
| *H04N 21/254* | (2011.01) | |
| *H04N 21/426* | (2011.01) | |

(52) U.S. Cl.
CPC ...... *H04N 7/17318* (2013.01); *G11B 20/00688* (2013.01); *G11B 2220/2541* (2013.01); *H04N 21/4627* (2013.01); *H04N 21/835* (2013.01); *G11B 20/00362* (2013.01); *G11B 20/00086* (2013.01); *H04N 21/2541* (2013.01); *H04N 21/42646* (2013.01); *G11B 20/00427* (2013.01); *G11B 20/00862* (2013.01); *G11B 20/00181* (2013.01); *G11B 20/00115* (2013.01)
USPC .......................................................... 726/29

(56) References Cited

U.S. PATENT DOCUMENTS

| | | | |
|---|---|---|---|
| 7,236,445 B2 * | 6/2007 | Hattori et al. ............ | 369/112.23 |
| 7,272,852 B2 * | 9/2007 | Honda et al. .................... | 726/10 |
| 7,295,994 B2 * | 11/2007 | Yoshida et al. ............ | 705/26.64 |
| 2002/0099661 A1 * | 7/2002 | Kii et al. ......................... | 705/51 |
| 2005/0177823 A1 * | 8/2005 | Miyake ......................... | 717/159 |
| 2010/0050250 A1 | 2/2010 | Ueda et al. | |

FOREIGN PATENT DOCUMENTS

| | | |
|---|---|---|
| JP | 10-083297 A | 3/1998 |
| JP | 2000-149414 A | 5/2000 |
| JP | 2008-021350 A | 1/2008 |
| JP | 2008-098765 A | 4/2008 |
| WO | WO 2008007482 A1 | 1/2008 |

* cited by examiner

INFORMATION PROCESSING APPARATUS, DATA PROCESSING METHOD AND PROGRAM

CROSS-REFERENCE TO RELATED APPLICATION

This application is a National Stage under 35 U.S.C. §371 of PCT international application PCT/JP2009/064239, entitled "INFORMATION PROCESSING DEVICE, METHOD FOR PROCESSING DATA, AND PROGRAM," filed on Aug. 12, 2009, which claims priority to Japanese Application Serial No. 2008-212485, filed on Aug. 21, 2008, each of which is hereby incorporated by reference in its entirety.

TECHNICAL FIELD

The present invention relates to an information processing apparatus, a data processing method and a program. More particularly, the present invention relates to an information processing apparatus, a data processing method and a program for performing content recording and copying to a recording medium.

BACKGROUND ART

A DVD (Digital Versatile Disc), a Blu-ray Disc® and the like are commonly used as a medium for recording various contents including music, movie and the like. These information recording media include a ROM-type medium on which data is already recorded and additional data cannot be written; and an R-type, RE-type and the like on which data can be written. A data-writable information recording medium enables a content recorded on another medium to be copied or moved. Also, the data-writable information recording medium enables a content to be downloaded for recording, for example, from a network or using an apparatus installed in a public place.

The content recording media also include a hard disk and a flash memory as well as the above-described DVD and Blu-ray Disc®.

The aspects of the process for recording a content on a recording medium may include the following, for example:

(a) copying or moving from a medium (e.g., ROM disc) on which a content is already recorded to another medium;

(b) downloading a content from a server for recording; and (c) recording a content using a terminal installed in a store or public place.

For example, the above processes may be envisaged.

However, many of contents such as music data and image data are under copyrights, distribution rights or the like owned by their authors or distributors. Therefore, when a content is provided to a user, a certain limitation is generally imposed on the use of the content such that the user may use the content only when the user is given an authorized right to use the content, and unauthorized duplication and the like are not allowed.

For example, one known standard for content usage control is AACS (Advanced Access Content System). According to AACS standard, performing content copying between media mentioned in (a) above requires obtaining copying permission information from a management server. Thus, the copying is permitted only under predetermined management. This copying processing is referred to as Managed Copy (MC).

The content providing scheme mentioned in (b) above—content providing by downloading—is referred to as EST (Electric Sell Through). The content providing by a shared terminal mentioned in (c) above is referred to as MoD (Manufacturing on Demand). According to AACS standard, these processings also need to be performed according to a predetermined rule.

The overview of the following three processings is described with reference to FIGS. 1 and 2:

(a) Managed Copy (MC), (b) EST (Electric Sell Through) and (c) MoD (Manufacturing on Demand).

(a) Managed Copy (MC)

Managed Copy (MC) is a processing in which, for example, as shown in (a) of FIG. 1, a user 1 sets an information recording medium (disc) 3 on which a content is already recorded in an information processing apparatus 2 for data recording/reproducing, then the content read from the information recording medium (disc) 3 is copied to a second information recording medium 4 such as an R/RE-type data-writable disc, hard disk and flash memory.

In order to perform this content copying, the data recording/reproducing apparatus 2 needs to connect with a management server 5 via a network 6 to obtain content copying permission from the management server 5.

Although FIG. 1 shows a configuration in which one information processing apparatus, a single apparatus, performs content copying between media, another configuration may be used in which one apparatus for loading a medium as copying source and another apparatus for loading a medium as copying destination are connected by, for example, a USB cable.

(b) EST (Electric Sell Through)

The processing of downloading a content from a server and recording the content to an information recording medium is referred to as EST (Electric Sell Through). EST is a processing in which, as shown in (b) of FIG. 2, a user 11 sets a medium, for example, R- or RE-type disc 12 (data-writable medium) owned by the user 11 in an information processing apparatus 13 of a PC or the like owned by the user 11, then a content is received from a content server (EST server) 14 via a network 15 and recorded.

(c) MoD (Manufacturing on Demand).

The content providing by a shared terminal is referred to as MoD (Manufacturing on Demand). As shown in (c) of FIG. 2, in Mod, a user 21 uses a content server 24 as a terminal installed in, for example, a convenience store or a public place such as station to purchase a content by recording the content to a medium. More specifically, Mod is a processing in which a data-writable medium owned by the user 21, for example, R- or RE-type disc 22 is set in the content server (Mod server) 24 as the terminal installed in a convenience store 23, and a desired content is recorded to the disc 22 through an operation, such as content selection, by the user 21.

These processings (a) to (c) are described in, for example, Patent Document 1 (JP-A-2008-98765).

In this way, the user can record a content to a data-recordable medium and use (for example, reproduce) the recorded content. However, when the content is, for example, a copyright-protected content or the like, usage control needs to be performed in order to prevent illegal use.

As described above, one known standard for content copyright protection technology is AACS (Advanced Access Content System). AACS standard configures usage control in which a usage control information (Usage Rule) defined for each content and a content is used according to the usage control information (Usage Rule). Furthermore, AACS standard provides strict usage control in which a content is configured to be an encrypted content by dividing the content into units, defining a unit key for each unit, and allowing only a specified user to obtain the unit keys.

When a disc on which a content is recorded is a medium allowing only reproducing and not allowing recording of new data, such as ROM-type disc, additional recording of a new content or editing will not be performed on the medium. Thus, the content-specific usage control information (Usage Rule) for each content recorded on the medium and the unit keys can be recorded together to the medium and provided to the user.

On the other hand, when a content is recorded on a medium such as R- or RE-type data-writable disc, hard disk and flash memory, the content recorded on the medium is not fixed, and updating such as recording of a new content or deleting of a recorded content can be performed. So, usage control information and unit keys also need to be updated according to the update of the content stored in the medium.

Thus, when recording a content to a medium, the user needs to perform complicated operations such as recording various ancillary data for each recorded content as well as recording the content. So, for example, in performing Managed Copy (MC) described above, a program in which a series of processing sequences is defined in advance is generally used to perform copying.

For example, many of information processing apparatuses conforming to AACS standard store a program (a player application) for performing Managed Copy (MC) described above. When using such an AACS-certified apparatus to perform Managed Copy (MC), the user runs the player application stored in the apparatus. When the program is run, a series of processings, including connecting with a management server and obtaining copying permission information from the management server, is performed, then copying is performed with the copying permission information obtained.

Even when a content recorded on a Blu-ray Disc® is copied to another medium, Managed Copy (MC) is performed using the player application stored in the AACS-certified apparatus.

For a method for starting this player application, the followings are permitted by AACS:

(a) starting the player application from a menu presented on the UI of the apparatus, and (b) starting BD-J (Blu-ray Disc Java®) application, which is a Java® application program stored on a disc on which a content is recorded, then starting the player application through a BD-J application.

AACS stipulates the use of one of (a) and (b) above.

The player application is a program stored in an apparatus that performs content reproducing/recording and designed to be commonly used for various contents. On the other hand, the BD-J application can be recorded on a disc and can also be configured specific to each content recorded on the disc. In other words, the BD-J application is a program that a content author can design according to the content recorded on the disc.

Thus, the BD-J application is a program that can be designed with some freedom by the content author and can be variously configured according to various configuration of the content. So, if the BD-J application is configured to perform Managed Copy (MC), the content author can also design the BD-J application to perform processing unique to each content according to the content configuration or the like.

However, in Managed Copy (MC), when the copying destination medium of a content is, for example, a freely portable medium such as R/RE-type data-writable disc, inadequate management of the copying destination medium may allow unauthorized use of the content.

PRIOR ART DOCUMENT

Patent Document

Patent Document 1: JP-A-2008-98765

SUMMARY OF THE INVENTION

Problems to be Solved by the Invention

In view of the above (for example), it is an object of the present invention to provide an information processing apparatus, a data processing method and a program in which, in performing content copying between media managed by a server, a copying destination medium for a content can be reliably managed to protect the content from unauthorized use.

For example, it is an object of the present invention to provide an information processing apparatus, a data processing method and a program in which the identification information (medium ID) of a copying destination medium, e.g., an R/RE-type disc, is obtained using an API (Application Programming Interface) for providing a predefined processing, then the medium ID is transmitted to a server to obtain copying permission information from the server, and then content copying is performed under the management of the server.

It is another object of the present invention to provide an information processing apparatus, a data processing method and a program in which content downloading from a server is performed according to a program defining processing sequences, for example, a Java® program.

Means for Solving the Problems

A first aspect of the present invention provides an information processing apparatus, including a data processor for reading data from a medium and communicating with a server, wherein the data processor performs:

medium ID reading processing of reading the medium ID of a second medium to which a content recorded on a first medium is to be copied;

medium ID transmitting processing of transmitting the medium ID to the server; and processing of obtaining copying permission information from the server, and wherein the medium ID reading processing is performed using an API (Application Programming Interface) defining the medium ID reading processing.

Furthermore, according to an embodiment of the information processing apparatus of the invention, the data processor executes a Java® application program on a virtual machine as a virtual hardware environment for program execution.

Furthermore, according to an embodiment of the information processing apparatus of the invention, with the copying permission information obtained, the data processor copies the content recorded on the first medium to the second medium.

Furthermore, according to an embodiment of the information processing apparatus of the invention, the data processor provides the copying permission information to a second data processor for performing content copying, and the second data processor performs content copying with the copying permission information obtained.

Furthermore, a second aspect of the invention provides
an information processing apparatus, including a data processor for reading data from a medium and communicating with a server,
wherein the data processor:
reads a program recorded on the medium and communicates with the server according to the program;
receives a list of contents obtainable from the server corresponding to contents stored in the medium;
transmits information on user selection from the list of contents to the server; and
performs content downloading from the server.

Furthermore, according to an embodiment of the information processing apparatus of the invention, the program is a Java® application program, and the data processor executes the Java® application program on a virtual machine as a virtual hardware environment for program execution.

Furthermore, according to an embodiment of the information processing apparatus of the invention, the data processor, when performing content recording to the medium, records a downloaded content from the server and a copied content from another medium in different directories.

Furthermore, a third aspect of the invention provides
a data processing method performed by an information processing apparatus, including:
medium ID reading step of reading the medium ID of a second medium to which a content recorded on a first medium is to be copied;
medium ID transmitting step of transmitting the medium ID to the server; and
step of obtaining copying permission information from the server, and
wherein the medium ID reading processing is performed using an API (Application Programming Interface) defining the medium ID reading processing.

Furthermore, a fourth aspect of the invention provides
a data processing method performed by an information processing apparatus, including the steps of:
reading a program recorded on a medium; and
according to the program, performing the following processings (a) to (c) of:
(a) obtaining from the server a list of contents obtainable from the server corresponding to contents stored in the medium;
(b) transmitting information on user selection from the list of contents to the server; and
(c) performing content downloading from the server.

Furthermore, a fifth aspect of the invention provides
a program for causing an information processing apparatus to perform data processing, including:
medium ID reading step of reading the medium ID of a second medium to which a content recorded on a first medium is to be copied;
medium ID transmitting step of transmitting the medium ID to the server; and
step of obtaining copying permission information from the server, and
wherein the medium ID reading step is defined to be performed using an API (Application Programming Interface) defining the medium ID reading.

Furthermore, a sixth aspect of the invention provides
a program for causing an information processing apparatus to perform data processing, including the steps of:
obtaining from the server a list of contents obtainable from the server corresponding to contents stored in the medium;
transmitting information on user selection from the list of contents to the server; and
performing content downloading from the server.

Note that the program in accordance with the invention is, for example, a computer program that can be provided in a computer-readable form from a recording medium or communication medium to a general-purpose computer system that can execute various program codes. Providing such a program in the computer-readable form allows the computer system to perform processing according to the program.

Still another purpose, feature and advantage of the invention will be apparent from the following more detailed description based on the embodiments of the invention and accompanying drawings. Note that, as used herein, "system" refers to a logical group configuration including multiple devices that is not limited to a configuration in which the components are within the same enclosure.

Advantage of the Invention

According to one embodiment of the invention, in content copying between media, the identification information (medium ID) of a copying destination medium, e.g., an R/RE-type disc, is obtained using an API (Application Programming Interface) for providing a predefined processing, then the obtained medium ID is transmitted to a server to obtain copying permission information from the server. With this copying permission information obtained, content copying is performed. This configuration allows a copying destination medium to be managed, which can eliminate the unauthorized use of the content. Also, content downloading from the server is performed according to, for example, a Java® program. This configuration allows a ROM disc on which the content is recorded to store the program and to be provided to a user.

MODE FOR CARRYING OUT THE INVENTION

An information processing apparatus, a data processing method and a program in accordance with the invention is described in detail below with reference to the drawings.

First, a processing example of Managed Copy (MC) performed by the information processing apparatus in accordance with the invention is described with reference to FIG. 3. As described above, Managed Copy (MC) is a processing of copying a content to another medium with copying permission information obtained from a management server.

Figure 3:
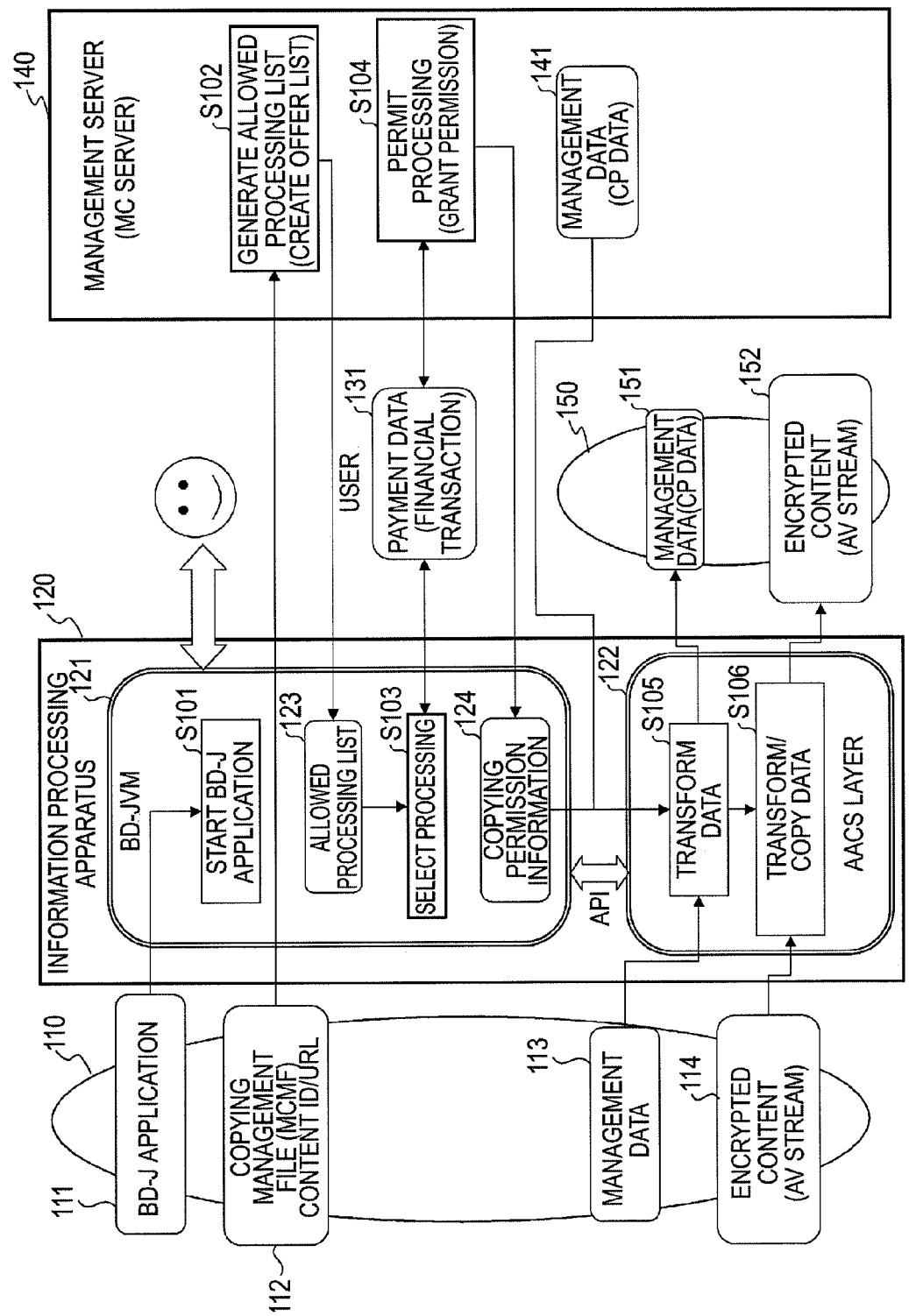
FIG. 3 A diagram illustrating a specific processing example of Managed Copy (MC) that is content copying between information recording media performed under predetermined management.

FIG. 3 shows from left: a disc 110 on which a content is recorded; an information processing apparatus 120 for reading the content from the disc 110 and recording the content to a data-recordable, second information recording medium 150; the data-recordable, second recording medium 150 as content copying destination; and a management server 140 for providing permission information for this content copying and management data.

The disc 110 is, for example, a ROM disc such as Blu-ray Disc®.

The data-recordable, second recording medium 150 as content copying destination is, for example, a recording medium such as hard disk, R/RE disc and flash memory.

The information processing apparatus 120 includes, for example, a PC, a recording/reproducing device and the like, and can read data from the disc 110 and record the read data to the second information recording medium 150.

As shown in FIG. 3, the following data are recorded on the disc 110:
a BD-J application 111 that is a Java® application program;
a copying management file (MCMF) 112;
management data 113; and
an encrypted content 114.

The BD-J application 111 is a program to be executed by the information processing apparatus 120 when content copying (Managed Copy (MC)) is performed, and, for example, a program for performing processing such as communicating with the management server 140. Note that the BD-J application 111 may be configured as a single application program or may be configured as a combination of two or more BD-J applications each performing a specific processing.

For example, they are a BD-J application for communicating with the server, a BD-J application dedicated to billing and the like. When performing content copying, these BD-J applications are executed by the information processing apparatus 120.

The copying management file (MCMF) 112 is a file to be used when content copying is performed, and, for example, a data file written in XML including the following information:

(a) a content ID that is an identifier (ID) for uniquely identifying the content recorded on the information recording medium (disc 110);

(b) a URI (URL) that is information for connecting with the management server for providing copying permission, generating a token by binding or performing another processing when content copying is performed (for example, information for accessing the management server 140); and (c) a directory name/file name that is information on names of a directory and a file storing data for permitting copying.

The management data 113 is, for example, management data defined by AACS (Advanced Access Content System) that is a standards management system for content copyright protection technology, and data including: a CPS unit key file storing keys (unit keys) to be used to decrypt the encrypted content 114; usage control information; a content certificate (CC) for showing the validity of the content; an MIKE (Media Key Block) that is an encryption key block storing key information (Media Key) for obtaining the CPS unit keys; and the like.

The encrypted content 114 is, for example, an encrypted content conforming to AACS standard. For example, the encrypted content 114 is an AV (Audio Visual) stream of moving image content such as an HD (High Definition) movie content that is high-definition moving image data, or a content including music data, a game program, an image file, sound data, text data and the like.

The encrypted content 114 is, for example, an encrypted content having a configuration in which usage management for each content management unit (CPS unit) is possible and to which the unit keys (CPS unit keys) differing for each content management unit (CPS unit) are applied. The encrypted content 114 is encrypted with the keys (CPS unit keys) differing for each unit allocated and is stored.

The information processing apparatus 120 includes two data processors.

A first data processor is a BD-JVM (BD-J Virtual Machine) 121. The BD-JVM (BD-J Virtual Machine) 121 is configured to be a virtual hardware as a virtual hardware environment in which the BD-J application 111 recorded on the disc 110 is executed.

A second data processor is an AACS layer 122. The AACS layer 122 is configured to be a data processor for performing data processing according to AACS standard, including the handling of highly secured information, such as obtaining an ID recorded on the disc 110, and the data transformation in content copying.

Thus, when a content recorded on the disc 110 is to be copied to another medium, the BD-JVM (BD-J Virtual Machine) 121 as an execution domain for the BD-J application 111 recorded on the disc 110 and the AACS layer 122 that is a program execution domain for performing processing according to AACS standard are configured, and passing a processing request and a processing result and the like are performed between them.

An API (Application Programming Interface) is used for such passing a processing request and a processing result and the like between the BD-J application and the AACS layer. The API is a group of functions and the like for executing various processings necessary for content copying. The API is stored in the BD-J application 111 or another area that can be read by the information processing apparatus 120. A specific example of the API is described in detail later.

The information processing apparatus 120 executes the BD-J application 111 in the BD-JVM 121 to communicate with the management server 140 and perform processing such as obtaining copying permission information 132.

In order to copy the content 114 stored on the disc 110 to the second information recording medium 150, processing such as transforming the content and usage control information (Usage Rule) to adapt to a destination medium is required. These processings are executed in the program execution domain (AACS layer 122) for performing processing according to AACS standard.

The BD-J application 111 is a program for performing processing necessary for content copying and is executed in the BD-JVM 121 of the information processing apparatus 120. For example, the following processings are performed using the BD-J application:

(a) accessing the server using the URI of the copying management file (MCMF);

(b) obtaining an allowed processing list from the server;

(c) transmitting information on processing selected by a user to the server;

(d) payment;

(e) obtaining and checking copying permission information from the server and providing the copying permission information to a recording controller;

(f) monitoring the process of content copying performed by the recording controller; and (g) monitoring the process of writing data downloaded from the server, performed by the recording controller.

These processings are performed using the BD-J application.

Note that, as described above, the BD-J application 111 may be configured as a single application program or may be configured as a combination of two or more BD-J applications each performing a specific processing. For example, the above-described processings (a) to (g) may be performed by two or more BD-J applications.

Processing using the BD-J application is described with reference to FIG. 3. In step S101 shown in FIG. 3, the BD-J application is started in the BD-JVM (BD-J Virtual Machine) 121 configured in the information processing apparatus 120.

Note that, when this processing is performed, a guide screen as user interface such as a menu offered by the BD-J application is displayed on a display of the information processing apparatus 120. According to an instruction from the user, a series of processings for performing content copying (Managed Copy) is started.

Based on the user instruction, the BD-J application, first, uses the server URI included in the copying management file (MCMF) 112 to access the management server 140. At this point, the content ID corresponding to the content to be copied is transmitted to the management server 140.

In step S102, based on the content ID received from the information processing apparatus 120, the management server 140 generates an allowed processing list listing processings allowed for the content and transmits the list to the information processing apparatus 120. For example, the list includes information on whether content copying is allowed or not, copying fee and the like.

The information processing apparatus 120 receives an allowed processing list 123 from the management server 140, and, in step S103, displays the allowed processing list on the display, from which the user selects processing to be performed.

When the user selects the processing to be performed, the information processing apparatus 120 performs payment processing with the management server 140 by transferring payment data 131. For example, the user enters and transmits data necessary for payment, such as a credit card number, on a payment screen. Next, in step S104, the management server 140 permits the processing to transmit copying permission information to the information processing apparatus 120.

The information processing apparatus 120 receives copying permission information 124 from the management server 140 and provides the copying permission information 124 to the AACS layer 122. In the AACS layer 122, the processings in step S105 and later are performed. The AACS layer 122 transforms the management data 113 read from the disc 110 to management data adapted to the medium type of the second recording medium 150, the copying destination, such as hard disk, R/RE disc and flash memory. For example, the AACS layer 122 adds encryption keys (unit keys) for the content to be copied and transforms the usage control information, the content certificate and the like to data for the content to be copied. Information necessary for these data transformations is included in the copying permission information 124. The transformed management data 151 will be recorded to the second recording medium 150.

Furthermore, in step S106, the information processing apparatus 120 loads the encrypted content 114 recorded on the disc 110 and outputs copied content data on which data transformation such as format transformation is performed. In this way, the copied data of the content recorded on the disc 110 will be recorded to the second recording medium 150 as encrypted content 152. Note that the management data 151 to be recorded to the second recording medium 150 includes usage control information, a content certificate, an MKB, a CPS unit key file, a token and the like for the content to be recorded to the second recording medium 150.

Note that, in content copying, between the information processing apparatus 120 and the management server 140, for example, a token may be generated and included as management data by checking the medium identifier (serial number) of the second recording medium 150 and signing with the secret key of the management server 140 with respect to the medium identifier. In FIG. 3, the management data including this token and the like is shown as management data 141 in the management server 140. These token information may be included in the management data (CP data) 151 to be recorded to the second recording medium 150.

Thus, the overview of content copying has been described with reference to FIG. 3. As described above, content copying is performed using the BD-J application and the program executed in the AACS layer. So, passing necessary information between the BD-J application and the execution program in the AACS layer is required. In order to achieve this, the API in which various processings are defined is used.

Figure 4:
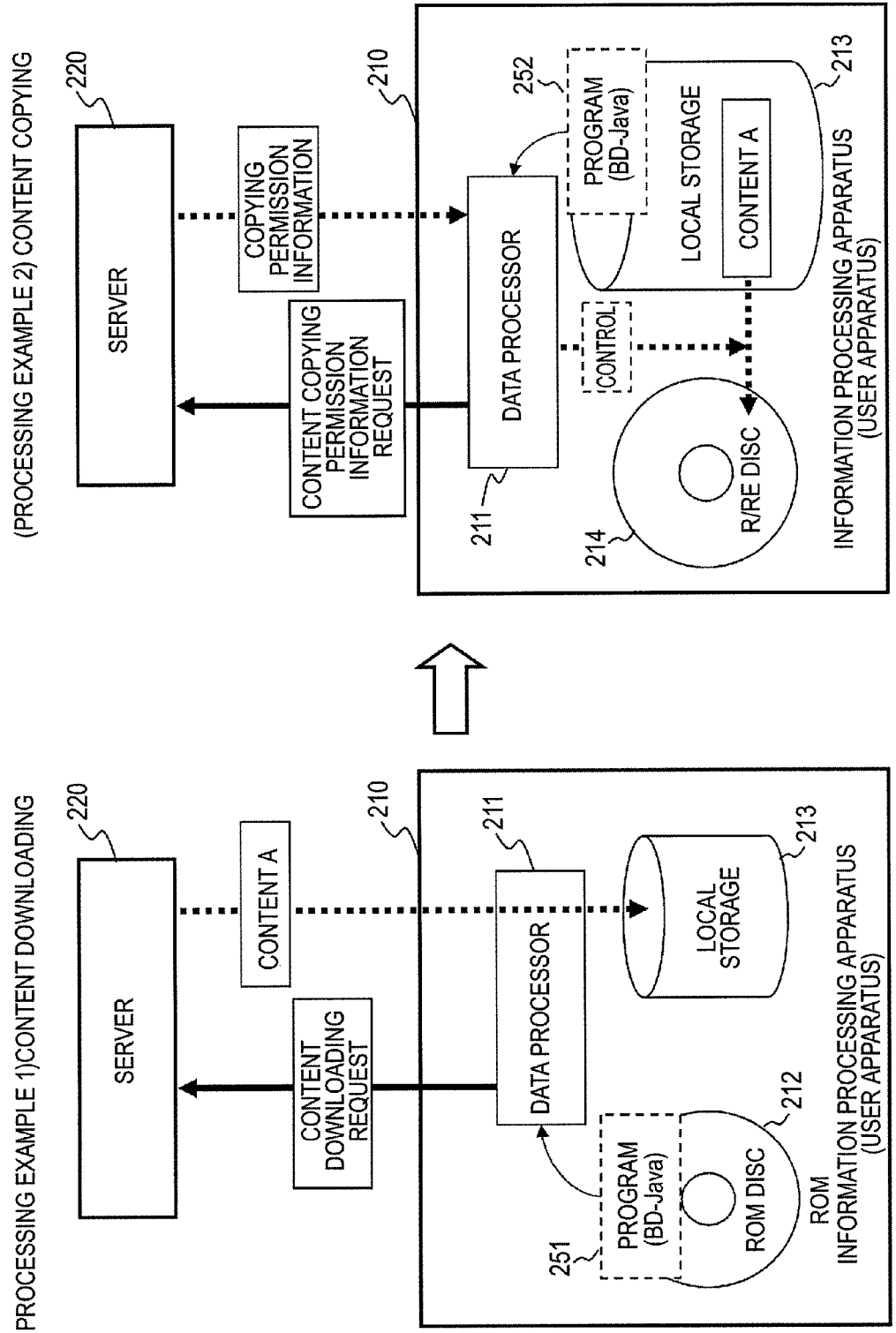
FIG. 4 A diagram illustrating examples of content downloading and content copying between media.

Next, processing examples using a server performed by an information processing apparatus in accordance with the invention are described with reference to FIG. 4. FIG. 4 shows the following two processings:

Processing Example 1

An information processing apparatus (user apparatus) 210 downloads a content A from a server 220 and stores the content A in a local storage 213; and Processing Example 2

The information processing apparatus 210 copies the content A stored in the local storage 213 to a data-recordable R/RE-type disc.

Figure 2:
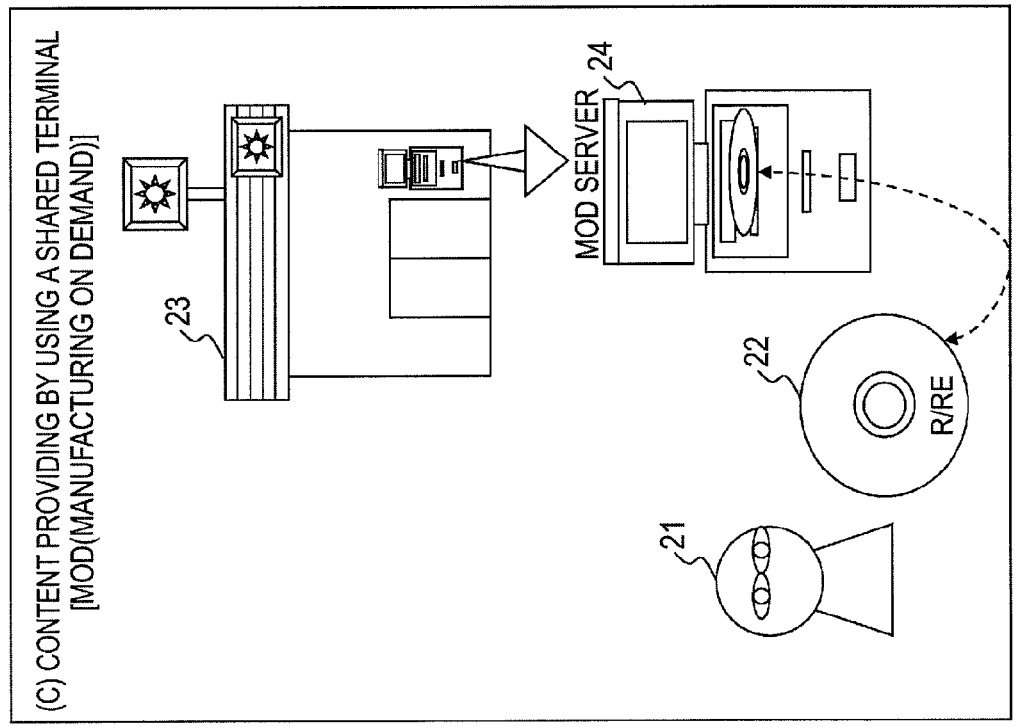
FIG. 2 A diagram illustrating EST that is content downloading from a server and Mod that is content providing via a shared terminal.
Figure 2:
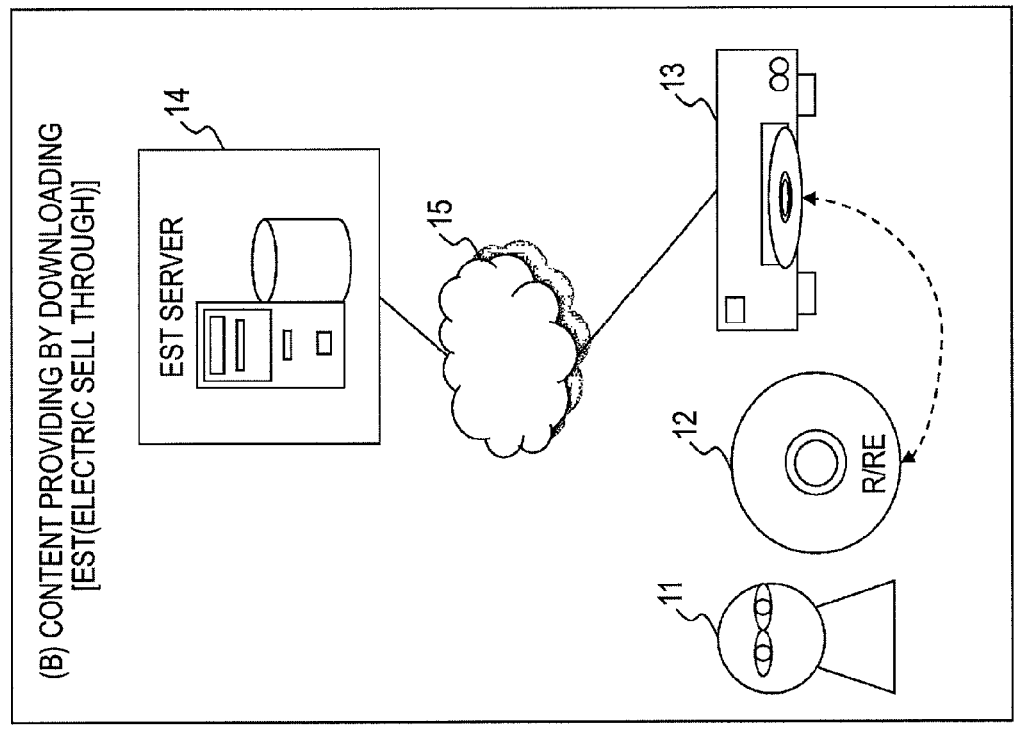

Processing Example 1 represents content downloading corresponding to EST (Electric Sell Through) already described with reference to (b) of FIG. 2.

Figure 1:
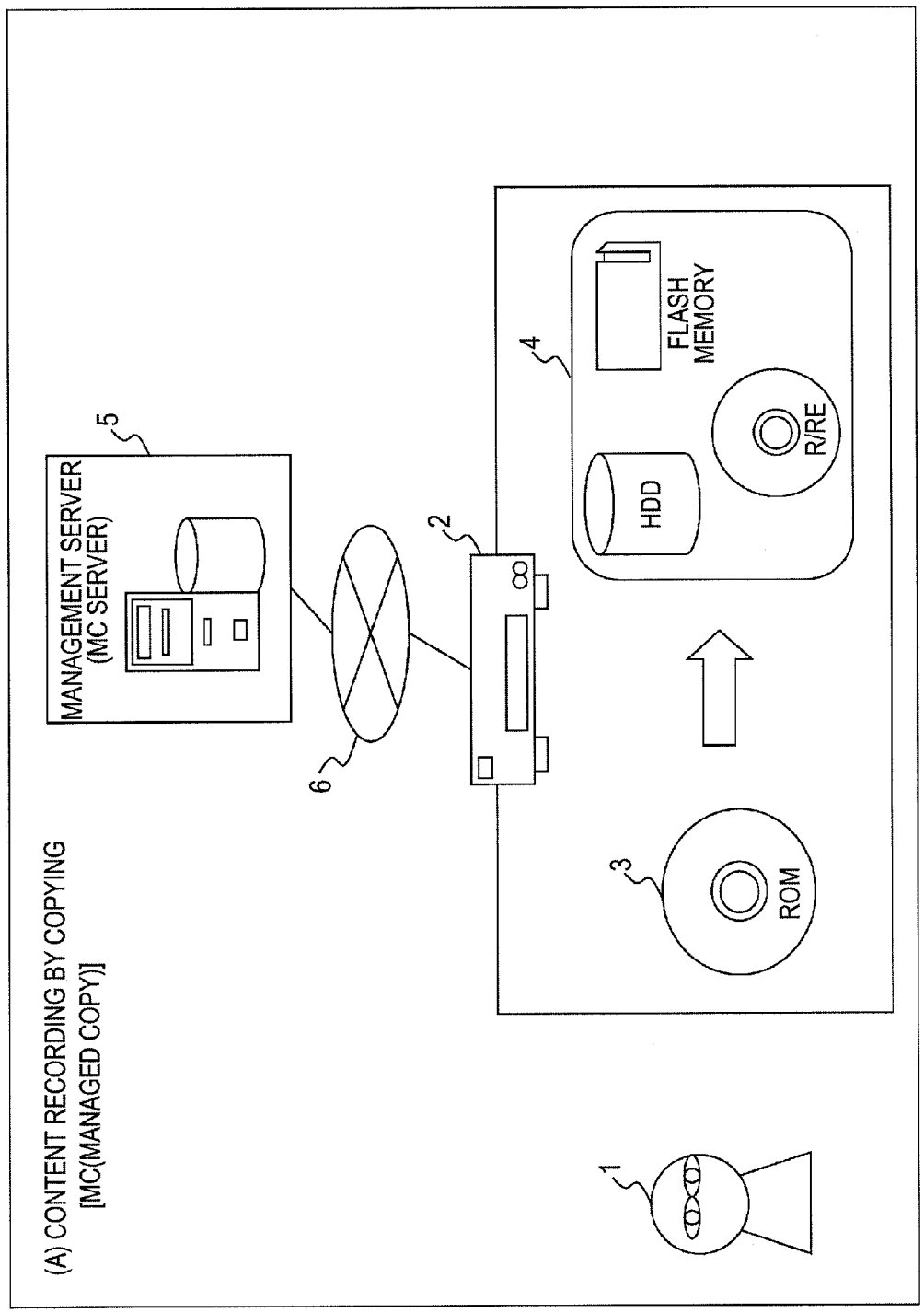
FIG. 1 A diagram illustrating an example of Managed Copy (MC) that is content copying between information recording media performed under predetermined management.

Processing Example 2 represents processing, corresponding to Managed Copy (MC) already described with reference to FIG. 1, of obtaining copying permission information from the server 220 and performing content copying between media.

The overview of Processing Example 1 is described.

First, the information processing apparatus 210 loads a ROM disc 212 on which a content such as a movie is recorded. Next, a data processor 211 executes a program 251 recorded on the ROM disc 212 to download the content A from the server 220. For example, when the ROM disc 212 is a Blu-ray Disc®, the program 251 is a BD-J application program that is a Java® program conforming to BD standard.

Next, the data processor 211 transmits a content downloading request to the server 220 according to the program 251. In response to the request, the server 220 provides the content A to the information processing apparatus 210. The data processor 211 of the information processing apparatus 210 stores the content A downloaded from the server 220 to the local storage 213, including, e.g., a hard disk or the like, in the apparatus 210.

Note that the following processing may also be performed in conjunction with downloading the content from the server 220: the information processing apparatus 210 transmits the ID of the information processing apparatus (device binding ID) and a random number (binding nonce) to the server 220; and in response to these data, the server signs with the server secret key and generates server authentication information (token) to be provided to the information processing apparatus 210.

In order to use the downloaded content in the information processing apparatus 210, the server authentication information (token) is checked to verify that the valid server authentication information (token) is obtained. Only if it is verified, decrypting and reproducing the downloaded content is permitted. This configuration permits only a specified device (information processing apparatus) to use the downloaded content.

Note that the local storage 213 stores various contents including: the content obtained by downloading from the server, as described above; and the content copied from the ROM disc, as already described with reference to FIG. 3, that is, the content copied by Managed Copy (MC) performed under the server management with the copying permission information obtained from the server.

Figure 5:
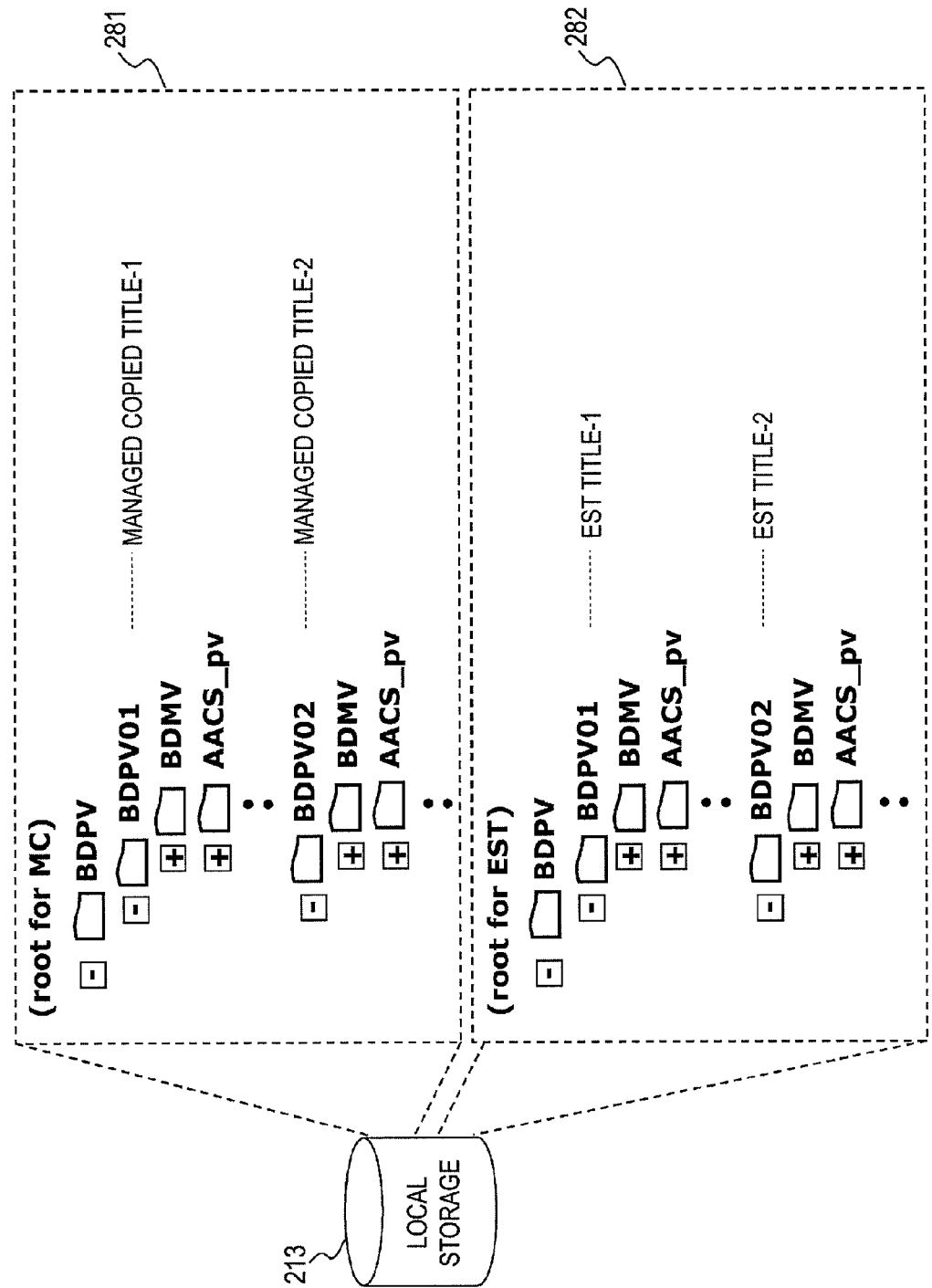
FIG. 5 A diagram illustrating an example of a directory structure of a local storage of an information processing apparatus.

FIG. 5 shows a directory structure example of the local storage in which these various contents are stored. For example, as shown in FIG. 5, in the local storage 213 including a hard disk, a copied content (MC content) directory 281 and a downloaded content (EST content) directory 282 are configured, the directory 281 storing a content and management data copied from another medium by Managed Copy and the directory 282 storing a content and management data downloaded from the server.

In the directories 281 and 282, the copied content and the downloaded content are organized by title and stored, respectively. When these contents are to be further copied to another medium, such an organization by title enables the contents to be selected and copied in a group. That is, these contents and management data stored in the local storage may be further copied to another medium, e.g., R/RE-type disc. For example, Processing Example 2 shown in FIG. 4 applies to this case.

Processing Example 2 shown in FIG. 4 is described. This processing further copies the content A stored in the local storage 213 to another medium, that is an R/RE-type disc 214 shown. The content A is a content copied from the ROM disc or downloaded from the server and subject to usage control. So, copying the content A requires copying permission information obtained from the server 220.

The program for performing the series of copying processing is, for example, a program stored in the local storage 213 (e.g., a BD-J application). This program for copying is, for example, the program used in Processing Example 1, which was obtained from the ROM disc 212 or the server 220 and stored in the local storage 213.

Note that a program 252 is different from the program 251 recorded on the ROM disc 212 shown in FIG. 4. The program 251 is for content downloading, and the program 252 is for content copying. The ROM disc 212 may have these different programs recorded thereon.

The R/RE-type disc 214 is an R-type or RE-type disc to which data can be recorded by a user. The R/RE-type disc 214 has the medium ID as disc-specific identifier recorded thereon. When copying requiring copying permission information obtained from the server, that is, Managed Copy (MC) is to be performed, the medium ID recorded on the R/RE-type disc 214 is transmitted to the server 220 to request the copying permission information.

The data processor 211 of the information processing apparatus 210 reads the program (BD-J) 252 from the local storage 213 and executes it. The data processor 211 performs the following series of processings according to the program 252: reading the medium ID recorded on the R/RE-type disc 214; transmitting the medium ID to the server 220; and obtaining the copying permission information from the server 220. After these processings, the content A stored in the local storage 213 is copied to the R/RE-type disc 214.

The detailed sequence of the two processings shown in FIG. 4:
(1) content downloading; and
(2) content copying;
is described with reference to FIGS. 6 and 7.

Figure 6:
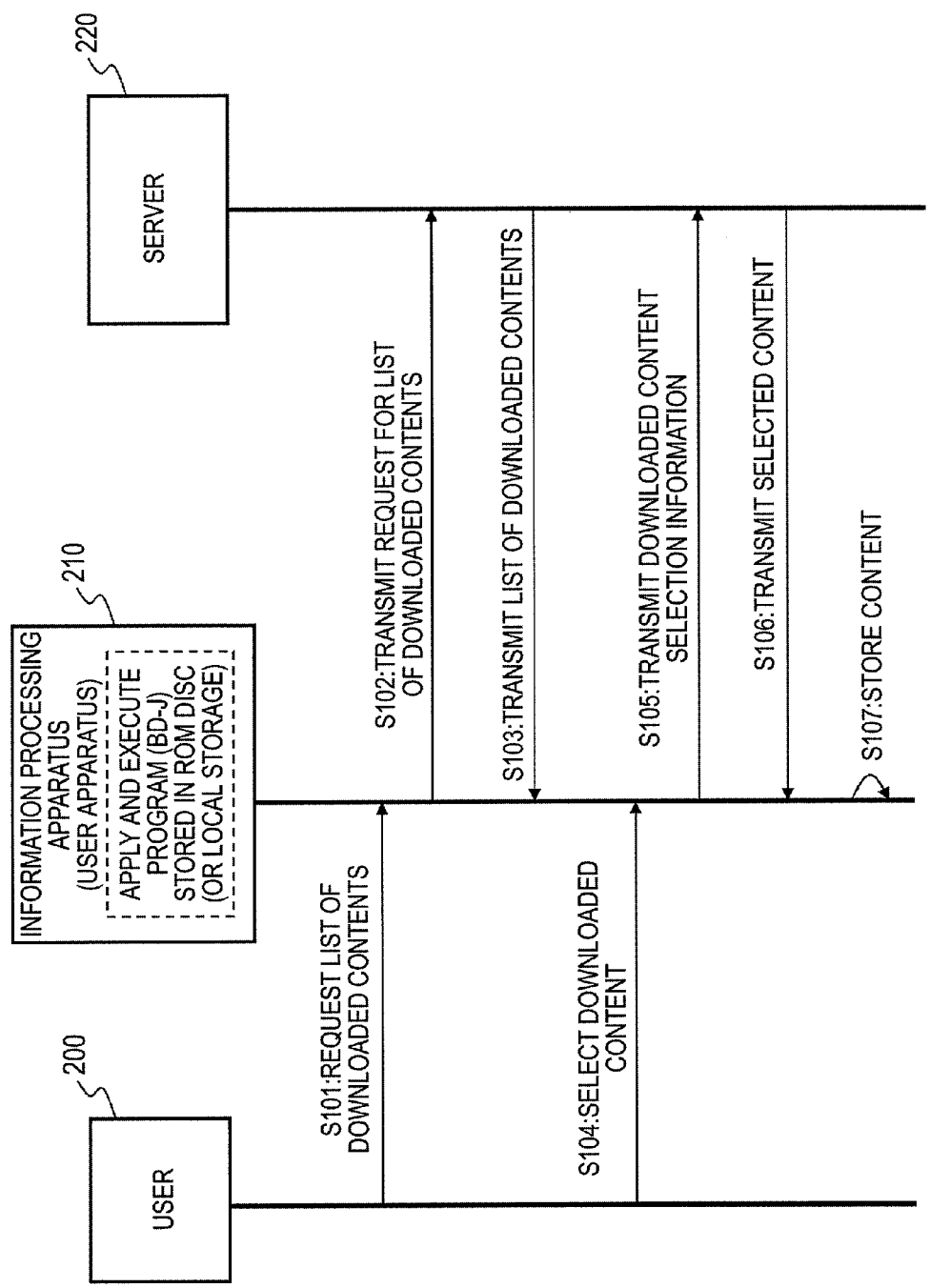
FIG. 6 A sequence diagram illustrating an example of a processing sequence of content downloading.

FIG. 6 shows the sequence of content downloading of Processing Example 1 in FIG. 4. FIG. 6 shows from right: the server 220 for providing a downloaded content; the information processing apparatus (user apparatus) 210 for obtaining the downloaded content; and a user 200 operating the information processing apparatus (user apparatus) 210.

The information processing apparatus 210 performs the series of processings shown in FIG. 6 by executing the program (the BD-J application program 251 shown in FIG. 4) stored in the ROM disc (the ROM disc 212 shown in FIG. 4) in the data processor. The BD-J application program 251 is a Java® application program. The data processor of the information processing apparatus 210 executes the Java® application program on a virtual machine as a virtual hardware environment for program execution.

When the data processor of the information processing apparatus 210 starts the program (BD-J application program 251), a user interface for allowing the user 200 to input an instruction is displayed on the display. The user 200 inputs an instruction such as a request to the information processing apparatus 210 through the user interface displayed on the display or through another input means.

First, in step S101, the user requests a list of downloadable contents from the information processing apparatus (user apparatus) 210. This is the list of contents that can be obtained corresponding to the contents stored in the ROM disc loaded in the information processing apparatus 210. More specifically, this is the list of contents (also referred to as subsequent data or trailer) allowed to be downloaded from the server 220 corresponding to the contents stored in the ROM disc.

step S102, in response to the user request, the information processing apparatus 210 requests the list of downloadable contents from the server 220. In step S103, the server 220 transmits the list to the information processing apparatus 210.

The information processing apparatus 210 displays the list received from the server on the display, and, in step S104, detects the input of selection information from the user based on the list. That is, the user inputs selection information of a content to be downloaded. In step S105, the information processing apparatus 210 transmits the downloaded content selection information to the server 220 to request the content to be downloaded.

In step S106, the server 220 provides the content to the information processing apparatus 210. In step S107, the information processing apparatus 210 stores the content downloaded from the server in the local storage including, e.g., a hard disk.

In this storing process, as already described with reference to FIG. 5, the data processor of the information processing apparatus 210 stores the downloaded content from the server and the copied content from another medium in different directories.

Figure 7:
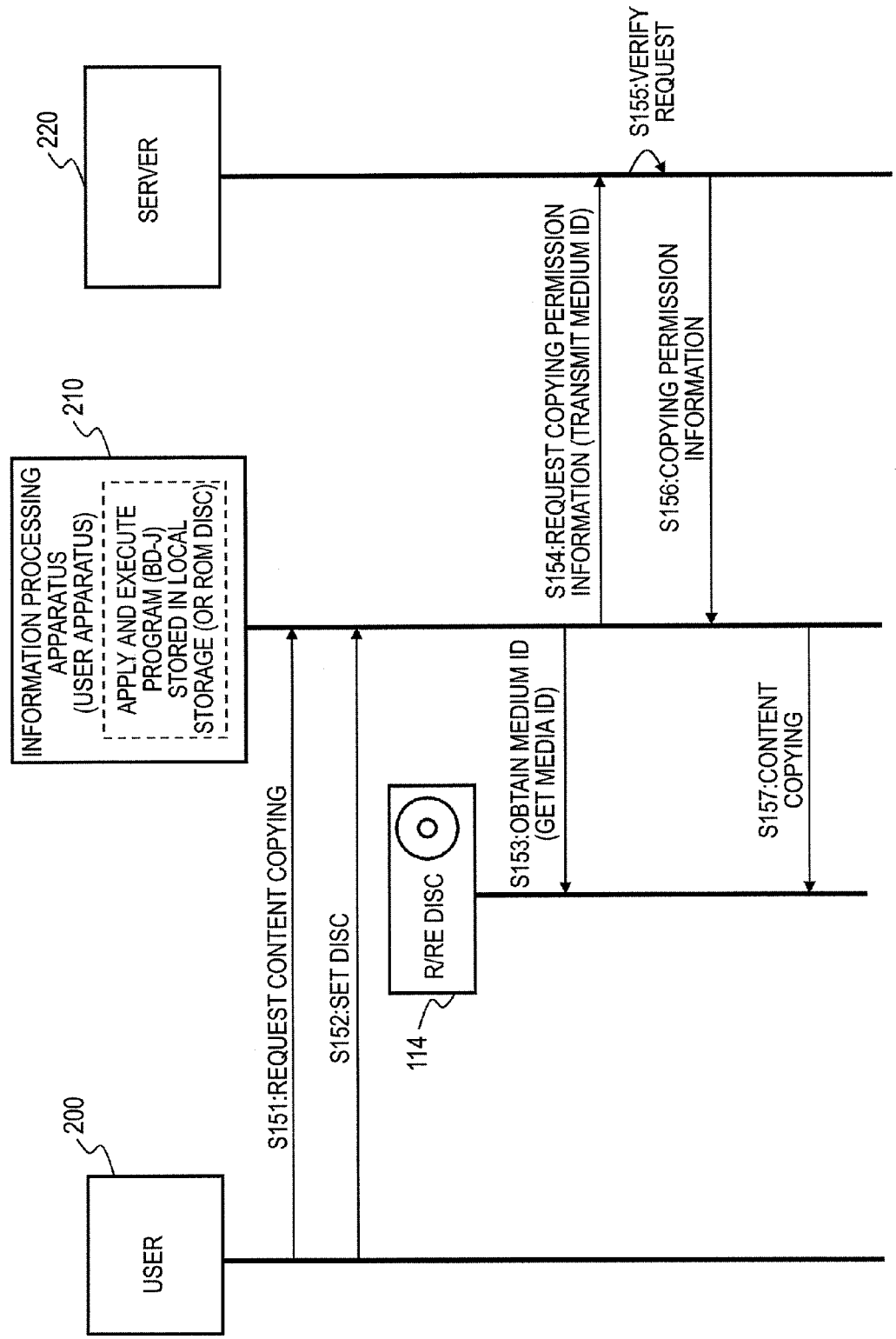
FIG. 7 A sequence diagram illustrating an example of a processing sequence of content copying between media.

Next, the detailed sequence of the content copying described with reference to Processing Example 2 in FIG. 4 is described with reference to a sequence diagram shown in FIG. 7. This is the sequence of copying a content stored in the local storage to another medium such as an R/RE-type disc.

The data processor of the information processing apparatus (user apparatus) 210 executes the program (the BD-J application program 252 shown in FIG. 4) stored in the local storage such as a hard disk (the local storage 213 shown in FIG. 4). The series of processings shown in FIG. 7 is performed by this program execution. The ED-J application program 252 is a Java® application program. The data processor of the information processing apparatus 210 executes the Java® application program on a virtual machine as a virtual hardware environment for program execution.

When the user 200 inputs an instruction such as a request for copying to the information processing apparatus 210 through the user interface displayed on the display or through another input means, the data processor of the information processing apparatus (user apparatus) 210 starts the program (BD-J application program) 252.

First, in step S151, the user requests the information processing apparatus (user apparatus) 210 to copy a content stored in the local storage. Specifically, the user inputs an instruction to start copying a content stored in the local storage of the information processing apparatus 210 to another medium.

In response to the user request, the information processing apparatus 210 instructs the user to set a content copying destination medium in the apparatus. In step S152, the user sets the copying destination medium (in this example, R/RE-type disc). Then, in step S153, the information processing apparatus 210 reads the identifier of the set R/RE-type disc (medium ID).

For example, an API (Application Programming Interface) defined in the program (BD-J application program 252) is used to read the medium ID. The API is a program unit defined by functions and the like for performing a predefined processing.

The API to be used here is an API [Get Media ID] that defines the reading of the medium ID of an R/RE-type disc. The processing sequence performed by this API may be included within the program (BD-J application program) 252 or may be recorded in a library or the like in the memory of the information processing apparatus 210. Or it may be obtained from the server and recorded in the memory in advance. The information processing apparatus 210 performs the sequence defined by the API [Get Media ID] to read the medium ID from the R/RE-type disc.

Next, in step S154, the information processing apparatus 210 transmits the medium ID read from the R/RE-type disc to the server 220 to request copying permission information. In this process of requesting the copying permission information, the information processing apparatus 210 transmits information including the content ID that is the identification information of the content to be copied as well as the medium ID of the copying destination medium.

On receiving the copying permission information from the information processing apparatus, the server 220 verifies and registers the received data in step S155, then transmits the copying permission information to the information processing apparatus 210 in step S156. Note that the copying permission information generated by the server 220 includes, for example, data (referred to as token) generated by signing with the secret key of the server 220 with respect to the medium ID of the copying destination medium.

After receiving the copying permission information, the information processing apparatus 210 performs content copying between media in step S157. Specifically, the information processing apparatus 210 copies the content stored in the local storage to the R/RE-type disc. In this copying, the copying permission information received from the server is also recorded to the R/RE-type disc.

Note that content copying in step S157 may be performed by the program (BD-J application program) 252 used for obtaining the copying permission information or may be performed by another program recorded in the information processing apparatus. In order to achieve content copying, data transformation and recording according to a specific format, such as data transformation and management information recording according to the type of a recording destination medium, is required. Then, a program dedicated to these copying processings may be stored in the information processing apparatus in advance and the processings using this program may be performed in content copying.

Figure 8:
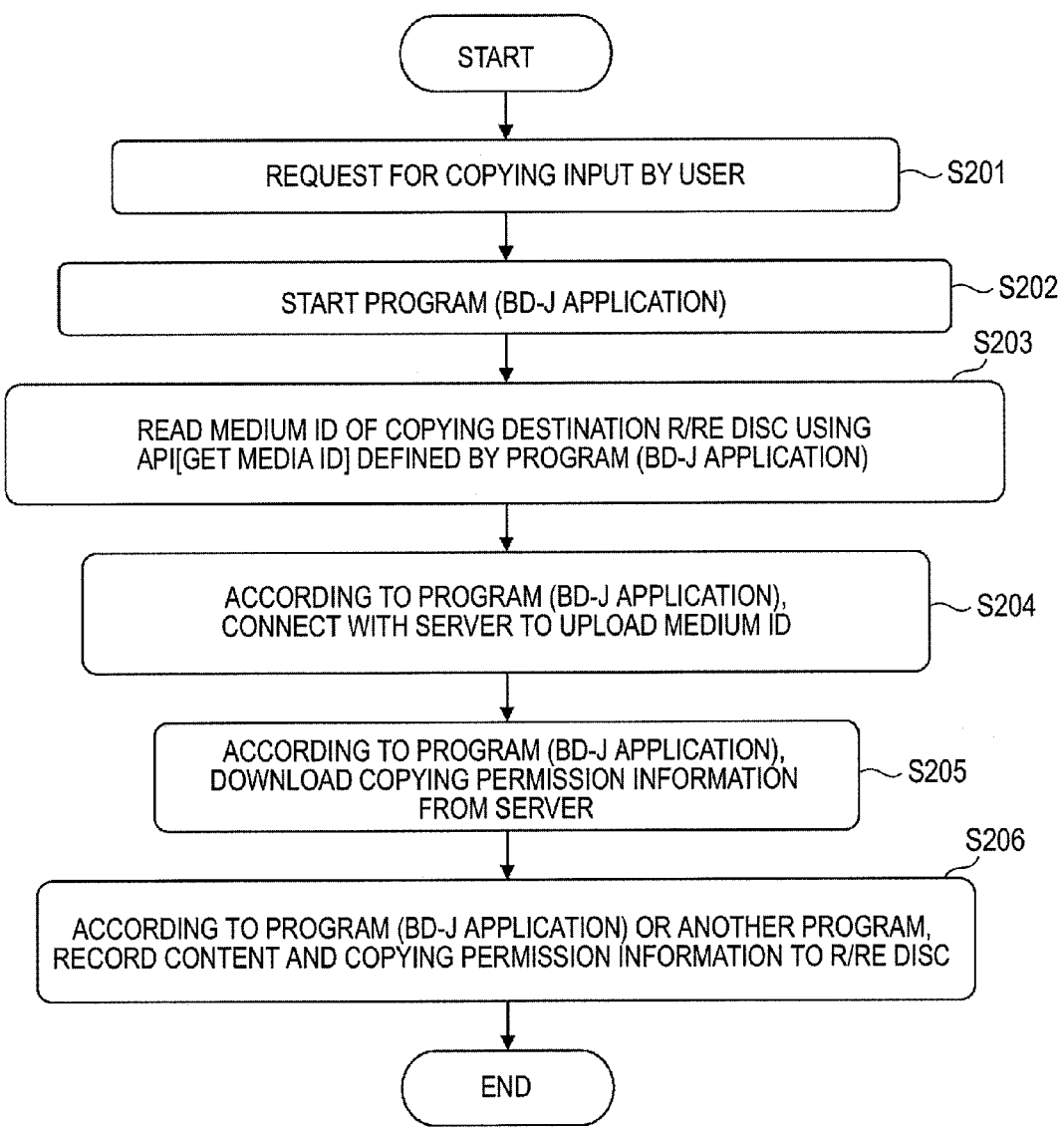
FIG. 8 A flowchart illustrating the processing sequence of content copying between media.

Next, with reference to a flowchart shown in FIG. 8, the processing sequence for content copying is described with respect to the information processing apparatus. As described with reference to FIG. 7, the information processing apparatus performs Managed Copy (MC), which is performed with the copying permission information obtained, by using, for example, the program (BD-J application program) stored in the local storage. Note that, as already described, the program (BD-J application program) may be obtained from the ROM disc on which the content is recorded, and then executed.

When the user inputs a request for copying in step S201, the program (BD-J application program) is executed in step S202, and the medium ID of the copying destination medium (R/RE-type disc) is read in step S203.

As described above, the reading of the medium ID is performed using the API [Get Media ID]. In step S204, according to the program (BD-J application program), the medium ID read from the copying destination medium (R/RE-type disc, flash memory, HDD and the like) is transmitted to the server to request the copying permission information.

In step S205, according to the program (BD-J application program), the copying permission information is obtained (downloaded) from the server. Finally, in step S206, according to the program (BD-J application program), the content recorded in the local storage is recorded to the copying destination medium (R/RE-type disc).

In this copying, the copying permission information received from the server is also recorded to the R/RE-type disc. Note that, as described above, this content copying may be performed by a program different from the program used for obtaining the copying permission information (BD-J application program), for example, a program recorded in the memory of the information processing apparatus (resident program).

Next, with reference to FIG. 9, the specific sequence of the content copying between media described with reference to FIGS. 7 and 8 and the data processing configuration of the information processing apparatus are described. As described with reference to FIGS. 7 and 8, content copying is performed by the program (BD-J application program) stored in the local storage, executed by the information processing apparatus.

The BD-J application program is a Java® program conforming to BD (Blu-ray Disc®) standard. In order to execute the BD-J application program, an information processing apparatus 310 configures a BD-JVM (BD-J Virtual Machine) 370 as shown in FIG. 9. The BD-JVM (BD-J Virtual Machine) 370 is a virtual machine as a virtual hardware environment in which a BD-J application 351 that is a Java® program stored in a local storage 350 is executed.

The BD-JVM (BD-J Virtual Machine) 370, serving as a first data processor, executes the BD-J application 351 stored in the local storage 350 to communicate with a server 320 and obtain copying permission information from the server 320.

Content copying after obtaining the copying permission information may be performed in the BD-JVM 370 using the BD-J application 351, or may be performed using a dedicated program recorded in the memory of the information processing apparatus in advance. In the configuration shown in FIG. 9, content copying is performed in an AACS layer 380 as a second data processor. The AACS layer 380 performs BD (Blu-ray Disc®) format transformation and recording according to the type of a content recording destination medium or the like.

Figure 9:
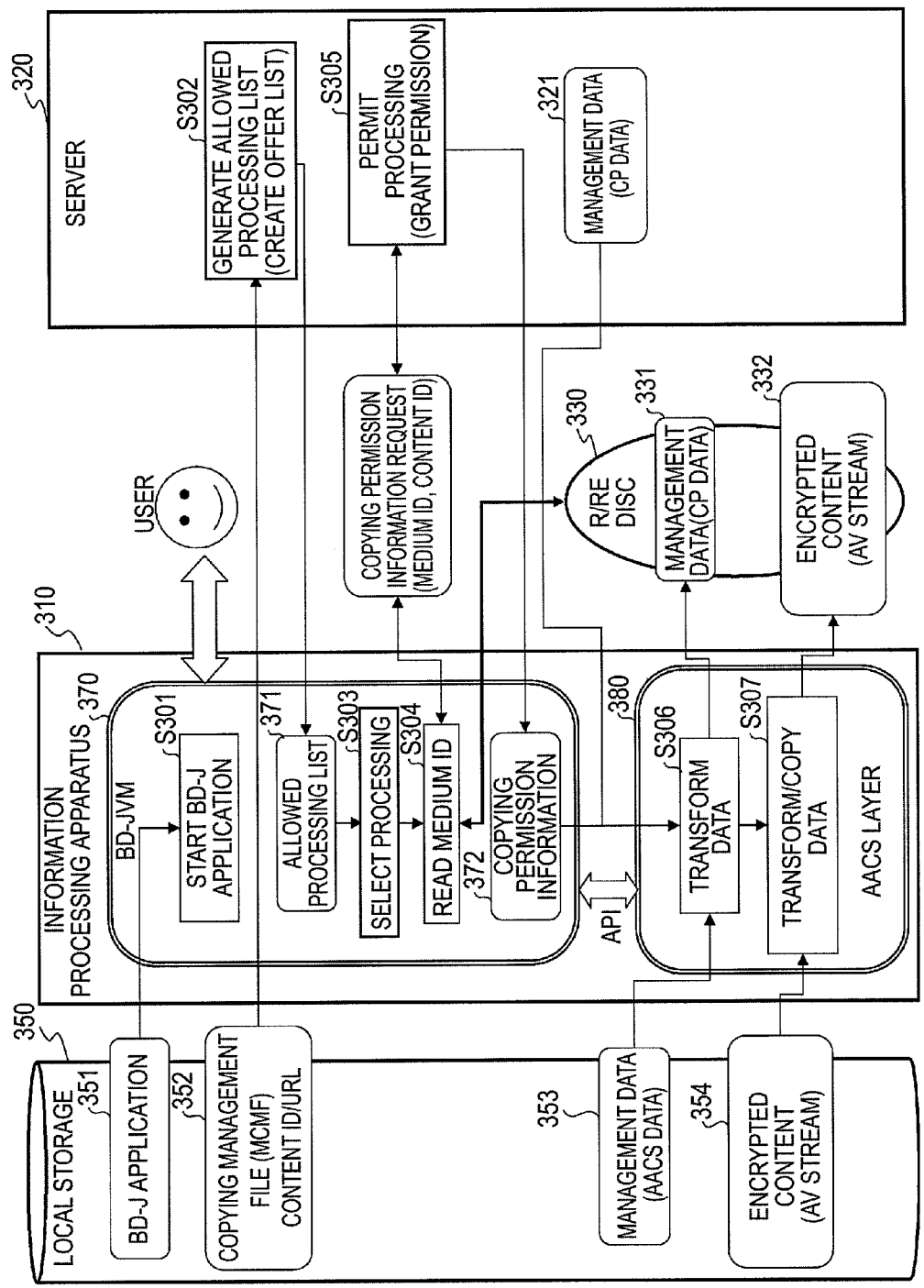
FIG. 9 A diagram illustrating a specific processing sequence and processing configuration of content copying between media.

FIG. 9 shows from left: the local storage 350 for storing an encrypted content 354 to be copied; the information processing apparatus 310 for obtaining the copying permission information and performing copying; an R/RE-type disc 330 as content copying destination; and the server 320 for providing the copying permission information.

The local storage 350 includes, for example, a hard disk. The information processing apparatus 310 includes, for example, a PC, a recording/reproducing device and the like. As shown in FIG. 9, the local storage 350 records the following data:

the BD-J application 351 that is a Java® application program;
a copying management file (MCMF) 352;
management data 353; and
the encrypted content 354.

The BD-J application 351 is a program to be executed by the information processing apparatus 310 when content copying (Managed Copy (MC)) is performed, and, for example, a program for performing a series of processings for content copying, such as communicating with the server 320. Note that the BD-J application 351 may be configured as a single application program or may be configured as a combination of two or more BD-J applications each performing a specific processing.

For example, they are a BD-J application for communicating with the server, a BD-J application dedicated to obtaining the copying permission information and the like. When performing content copying, these BD-J applications are executed by the information processing apparatus 310.

The copying management file (MCMF) 352 is a file to be used when content copying is performed, and, for example, a data file written in XML including the following information:

(a) a content ID that is an identifier (ID) for uniquely identifying the content recorded in the local storage 350;

(b) a URI (URL) that is information for connecting with the server for providing copying permission, generating a token by binding or performing another processing when content copying is performed (for example, information for accessing the server 320); and (c) a directory name/file name that is information on names of a directory and a file recording data for permitting copying.

The management data 353 is, for example, management data defined by AACS (Advanced Access Content System) that is a standards management system for content copyright protection technology, and data including: a CPS unit key file storing keys (unit keys) to be used to decrypt the encrypted content 354; usage control information; a content certificate (CC) for showing the validity of the content; an MKB (Media Key Block) that is an encryption key block storing key information (Media Key) for obtaining the CPS unit keys; and the like.

The encrypted content 354 is a content copied from the ROM disc or downloaded from the server. For example, the encrypted content 354 is an encrypted content subject to usage control conforming to AACS standard. For example, the encrypted content 354 is an AV (Audio Visual) stream of moving image content such as an HD (High Definition) movie content that is high-definition moving image data, or a content including music data, a game program, an image file, sound data, text data and the like.

The encrypted content 354 is, for example, an encrypted content having a configuration in which usage management for each content management unit (CPS unit) is possible and to which the unit keys (CPS unit keys) differing for each content management unit (CPS unit) are applied. The encrypted content 354 is encrypted with the keys (CPS unit keys) differing for each unit allocated and is stored.

The information processing apparatus 310 includes two data processors.

The first data processor is the BD-JVM (BD-J Virtual Machine) 370. The BD-JVM (BD-J Virtual Machine) 370 is configured to be a virtual machine as a virtual hardware environment in which the BD-J application 351 recorded in the local storage 350 is executed.

The second data processor is the AACS layer 380. The AACS layer 380 is configured to be a data processor for performing data processing according to AACS standard, including the handling of highly secured information and the data transformation in content copying.

Thus, when a content recorded in the local storage 350 is to be copied to another medium, the BD-JVM (BD-J Virtual Machine) 370 as an execution domain for the BD-J application 351 stored in the local storage 350 and the AACS layer 380 that is a program execution domain for performing processing according to AACS standard are configured, and passing a processing request and a processing result and the like are performed between them.

Note that an API (Application Programming Interface) is used for such passing a processing request and a processing result and the like between the BD-J application and the ARCS layer. The API is a group of functions and the like for executing various processings necessary for content copying. The API is recorded in the BD-J application 351 or another area that can be read by the information processing apparatus 310.

The information processing apparatus 310 executes the BD-J application 351 in the BD-JVM 370 to communicate with the server 320 and perform processing such as obtaining copying permission information 372.

In order to copy the content 354 stored in the local storage 350 to an R/RE-type disc 330 as the second recording medium, processing such as transforming the content and usage control information (Usage Rule) to adapt to a destination medium is required. In this example, these processings are configured to be executed in the program execution domain for performing processing according to AACS standard (AACS layer 380). As already described, these processings may also be performed using the BD-J application 351.

The BD-J application 351 is a program for performing processing necessary for content copying and is executed in the BD-JVM 370 of the information processing apparatus 310. For example, the following processings are performed using the BD-J application:

(a) accessing the server using the URI of the copying management file (MCMF);

(b) obtaining an allowed processing list from the server;

(c) transmitting information on processing selected by a user to the server;

(d) transmitting the medium ID of a copying destination medium to the server;

(e) obtaining and checking copying permission information from the server and providing the copying permission information to a recording controller;

(f) monitoring the process of content copying performed by the recording controller; and (g) monitoring the process of writing data downloaded from the server, performed by the recording controller.

These processings are performed using the BD-J application.

Note that, as described above, the BD-J application 351 may be configured as a single application program or may be configured as a combination of two or more BD-J applications each performing a specific processing. For example, the above-described processings (a) to (g) may be performed by two or more BD-J applications.

Processing using the BD-J application is described with reference to FIG. 9. In step S301 shown in FIG. 9, the BD-J application is started in the BD-JVM (BD-J Virtual Machine) 370 configured in the information processing apparatus 310.

Note that, when this processing is performed, a guide screen as user interface such as a menu offered by the BD-J application is displayed on a display of the information processing apparatus 310. According to an instruction from the user, a series of processings for performing content copying (Managed Copy) is started.

Based on the user instruction, the BD-J application, first, uses the server URI included in the copying management file (MCMF) 352 to access the server 320. At this point, the content ID corresponding to the content to be copied is transmitted to the server 320.

In step S302, based on the content ID received from the information processing apparatus 310, the server 320 generates an allowed processing list listing processings allowed for the content and transmits the list to the information processing apparatus 310. For example, the list includes information on whether content copying is allowed or not, copying fee and the like.

The information processing apparatus 310 receives an allowed processing list 371 from the server 320, and, in step S303, displays the allowed processing list on the display, from which the user selects processing to be performed.

When the user selects the processing to be performed, the BD-JVM (BD-J Virtual Machine) 370, in step S304, reads the medium ID from the R/RE-type disc 330 that is the copying destination medium and transmits a copying permission information request to the server 320.

As already described, the API [get Media ID] that defines the reading of a medium ID is used to read the medium ID from the R/RE-type disc 330 that is the copying destination medium.

The copying permission information request including the medium ID read by the API from the R/RE-type disc 330 that is the copying destination medium is transmitted to the server 320. The copying permission information request includes the medium ID of the copying destination medium, the content ID of the content to be copied and the like. Next, in step S305, the server 320 verifies the request and registers the information, then transmits the copying permission information to the information processing apparatus 310.

With copying permission information 372 obtained from the server 320, the information processing apparatus 310 starts to copy the content stored in the local storage 350 to the R/RE-type disc 330, the copying destination. This processing may be performed using the BD-J application 351 executed by the BD-JVM (BD-J Virtual Machine) 370 or may be performed using a dedicated program.

In the configuration shown in FIG. 9, content copying is performed by the AACS layer as the second data processor that executes the dedicated program. The BD-JVM (BD-J Virtual Machine) 370 receives the copying permission information 372 from the server 320 and provides the copying permission information 372 to the AACS layer 380.

On accepting the copying permission information 372, the AACS layer 380 performs the processings in step S306 and later. The ARCS layer 380 transforms the management data 353 read from the local storage 350 to management data adapted to the medium type of, for example, the R/RE-type disc 330, the copying destination. For example, the AACS layer 380 adds encryption keys (unit keys) for the content to be copied and transforms the usage control information, the content certificate and the like to data for the content to be copied. Information necessary for these data transformations is included in the copying permission information 372. Transformed management data 331 is recorded to the R/RE-type disc 330 as copying destination medium.

Furthermore, in step S307, the information processing apparatus 310 loads the encrypted content 354 recorded in the local storage 350 and outputs copied content data on which data transformation such as format transformation is performed. In this way, the copied data of the content recorded in the local storage 350 is recorded as an encrypted content 332 to the R/RE-type disc 330 as copying destination medium. Note that the management data 331 to be recorded to the R/RE-type disc 330 as copying destination medium includes usage control information, a content certificate, an MKB, a CPS unit key file, copying permission information and the like for the content to be recorded to the R/RE-type disc 330.

Note that, as described above, the copying permission information generated by the server 320 is, for example, data (referred to as token) generated by signing with the secret key of the server 320 with respect to the medium ID of the copying destination medium. The information processing apparatus 310 records this token to be included in the management data 331 to be recorded to the R/RE-type disc 330.

Note that, in the processing configuration shown in FIG. 9, the two data processors—the BD-JVM (BD-J Virtual Machine) 370 for executing the BD-J application and the ARCS layer 380—are configured and perform their own processings. When processings need to be performed by the AACS layer, the BD-J application appropriately selects and uses two or more of prepared APIs to request the AACS layer to perform various processings. Note that the APIs may be recorded in the BD-J application program or may be stored in an area that can be read by the BD-J application, for example, may be recorded on the disc or stored in the memory of the information processing apparatus. Thus, the BD-J application can perform Managed Copy using APIs to request the AACS layer to perform required processings.

Data copied between media and data generated by the server and the like in performing content copying between media are described with reference to FIG. 10.

Figure 10:
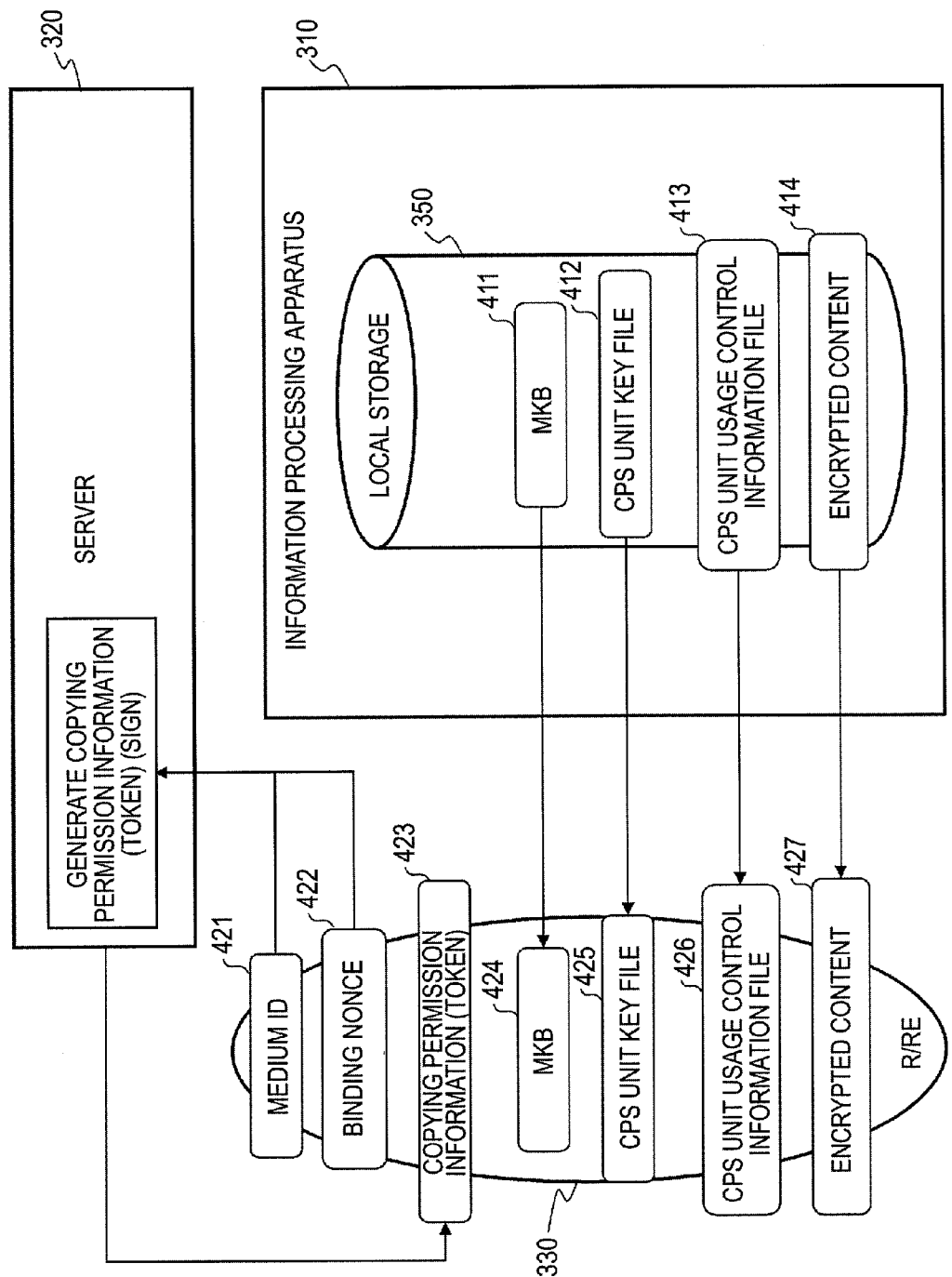
FIG. 10 A diagram illustrating the detail of moving and recording data performed in content copying between media.

FIG. 10 shows the server 320 for generating and providing the copying permission information, the information processing apparatus 310 including the local storage 350 and the R/RE-type disc 330 that is the copying destination medium. The local storage 350 stores: an encrypted content 414 to be copied; an MKB 411 as key information required to decrypt the encrypted content 414; a CPS unit key file 412; and a CPS unit usage control information file 413 storing the usage control information for the encrypted content 414. The encrypted content 414 is a content that can be divided into CPS units as usage control units and in which usage control differing for each CPS unit is possible.

When the encrypted content 414 recorded in the local storage 350 is to be copied for use to the R/RE-type disc 330 that is the copying destination medium, all of the MKB 411 as key information required to decrypt the encrypted content, the CPS unit key file 412 and the CPS unit usage control information file 413 are required to be copied to the R/RE-type disc 330. An MKB 424, a CPS unit key file 425, a CPS unit usage control information file 426 and an encrypted content 427 on the R/RE-type disc 330 shown in the drawing are copied from the local storage 350.

Furthermore, copying permission information (token) 423 needs to be obtained from the server 320 and recorded. In order to obtain the copying permission information (token) 423, the medium ID 421 of the R/RE-type disc 330 is transmitted to the server 320. In this example, furthermore, a binding nonce 422 including random number data is transmitted along with a medium ID 421 to the server 320. Note that the binding nonce 422 may not necessarily be data recorded on the R/RE-type disc 330 in advance, but may use a random number generated by the information processing apparatus 310.

The server 320 receives the binding nonce 422 and the medium ID 421 from the information processing apparatus 310, and generates the copying permission information (token) signed with the secret key of the server with respect to these received data, and then transmits the copying permission information (token) to the information processing apparatus 310. The information processing apparatus 310 records the copying permission information (token) to the R/RE-type disc 330, which is the copying permission information (token) 423 shown in the drawing.

Figure 11:
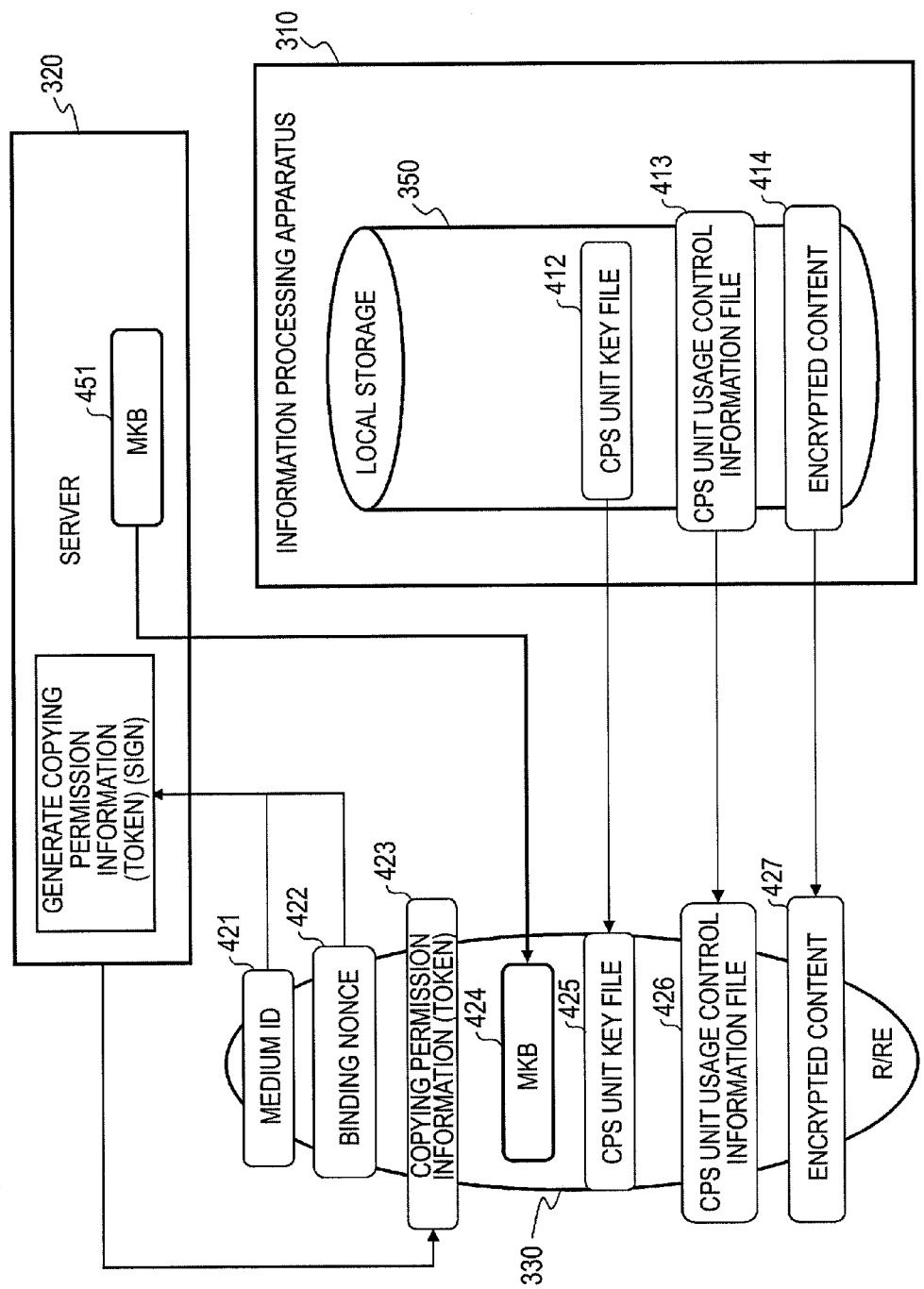
FIG. 11 A diagram illustrating the detail of moving and recording data performed in content copying between media.

Note that the processing example shown in FIG. 10 is just an example, and another processing example is also possible. For example, as shown in FIG. 11, the MKB to be used to obtain the key for decrypting the encrypted content may be provided by the server 320. As shown in FIG. 11, an MKB 451 included in the server 320 is transmitted to the information processing apparatus 310 which records the MKB 451 to the R/RE-type disc 330 as the MKB 424 shown in the drawing.

Thus, the invention has been described in detail with reference to the specific embodiment. However, it is apparent that modifications and substitution may be made on the embodiment by those skilled in the art without departing from the spirit and scope of the invention. In other words, the invention has been disclosed in an exemplary manner and should not be construed as restrictive. In order to determine the scope of the invention, the appended claims should be considered.

Also, the series of processings described herein can be implemented using hardware or software or a combination thereof. In order to perform a processing implemented using software, a program including the processing sequence may be installed and executed in the memory of a computer embedded in a dedicated hardware or may be installed and executed in a general-purpose computer capable of performing various processings. For example, the program can be recorded in a recording medium in advance. Then, the program can be installed from the recording medium into the computer. Also, the program can be received from a network such as a local area network (LAN) or Internet and installed into a recording medium such as hard disk in the computer.

Note that the various processings described herein may be performed in parallel or separately depending on the capability of the apparatus for performing the processings or depending on the necessity as well as being performed in the time series according to the description. Also, as used herein, "system" refers to a logical group configuration including multiple devices that is not limited to a configuration in which the components are within the same enclosure.

INDUSTRIAL APPLICABILITY

As described above, according to one embodiment of the invention, in content copying between media, the identification information (medium ID) of a copying destination medium, e.g., an R/RE-type disc, is obtained using an API (Application Programming Interface) for providing a predefined processing, then the obtained medium ID is transmitted to a server to obtain copying permission information from the server. With this copying permission information obtained, content copying is performed. This configuration allows a copying destination medium to be managed, which can eliminate the unauthorized use of the content. Also, content downloading from the server is performed according to, for example, a Java® program. This configuration allows a ROM disc on which the content is recorded to store the program and to be provided to a user.

The invention claimed is:

1. An information processing apparatus configured to read data from a first local medium, write data to a second local medium, and communicate with a remote server, the information processing apparatus comprising:
at least one processor configured to perform:
reading a medium ID of the second local medium to which content recorded on the first local medium is to be copied;
transmitting the medium ID to the remote server;
receiving, from the remote server, management control information comprising a token generated at the remote server by signing the medium ID with a secret key of the remote server;
copying the content from the first local medium to the second local medium, when copying permission information is received from the remote server in response to transmitting the medium ID to the remote server; and
writing the received management control information to the second local medium,
wherein the second local medium is an optical disc.

2. The information processing apparatus according to claim 1, wherein the at least one processor is configured to use a blue laser to read the content recorded on the first local medium.

3. The information processing apparatus according to claim 1, wherein the copying comprises copying the copying permission information to the second local medium.

4. An information processing apparatus configured to read data from a first local medium storing media content, wherein the information processing apparatus comprises:
at least one processor configured to perform:
receiving, from a remote server, a list of content corresponding to the media content stored on the first local medium;
transmitting, to the remote server, information indicative of content selected by a user from the list of content;
downloading the selected content from the remote server; and
storing the downloaded content on the second local medium, wherein the first local medium is physically within the information processing apparatus when the information processing apparatus reads data from the first local medium.

5. The information processing apparatus according to claim 4, wherein the information processing apparatus is configured to use a blue laser to read the stored content stored on the first local medium.

6. A method performed by an information processing apparatus configured to read data from a first local medium, write data to a second local medium, and communicate with a remote server, the method comprising:
    reading a medium ID of the second local medium to which content recorded on the first local medium is to be copied;
    transmitting the medium ID to the remote server;
    receiving, from the remote server, management control information comprising a token generated at the remote server by signing the medium ID with a secret key of the remote server;
    copying the content from the first local medium to the second local medium, when copying permission information is received from the remote server in response to transmitting the medium ID to the remote server; and
    writing the received management control information to the second local medium,
    wherein the second local medium is an optical disc.

7. A method performed by an information processing apparatus configured to read data from a first local medium storing media content, the method comprising acts of:
    (a) obtaining, from a remote server, a list of content corresponding to the media content stored on the first local medium;
    (b) transmitting, to the remote server, information indicative of content selected by a user from the list of content;
    (c) downloading the selected content from the remote server; and
    (d) storing the downloaded content on the second local medium,
    wherein the first local medium is physically within the information processing apparatus when the information processing apparatus reads data from the first local medium.

8. At least one non-transitory computer-readable storage medium storing a program for causing an information processing apparatus, which is configured to read data from a first local medium, write data to a second local medium, and communicate with a remote server, to perform a method comprising:
    reading a medium ID of the second local medium to which content recorded on the first local medium is to be copied;
    transmitting the medium ID to the remote server;
    receiving, from the remote server, management control information comprising a token generated at the remote server by signing the medium ID with a secret key of the remote server;
    copying the content from the first local medium to the second local medium, when copying permission information is received from the remote server in response to transmitting the medium ID to the remote server; and
    writing the received management control information to the second local medium,
    wherein the second local medium is an optical disc.

9. At least one non-transitory computer-readable storage medium storing a program for causing an information processing apparatus, which is configured to read data from a first local medium storing media content, to perform a method comprising:
    obtaining, from the remote server, a list of content corresponding to the media content stored on the first local medium;
    transmitting, to the remote server, information indicative of content selected by a user from the list of content;
    downloading the selected content from the remote server; and
    storing the downloaded content on the second local medium,
    wherein the first local medium is physically within the information processing apparatus when the information processing apparatus reads data from the first local medium.

10. The method of claim 6, wherein copying the content from the first local medium comprises reading the content using a blue laser.

11. The at least one non-transitory computer-readable storage medium of claim 8, wherein the at least one computer-readable storage medium is the first local medium.

12. The at least one non-transitory computer-readable storage medium of claim 9, wherein the at least one computer-readable storage medium is the first local medium.

* * * * *